(12) United States Patent
Moussios et al.

(10) Patent No.: US 8,722,772 B2
(45) Date of Patent: May 13, 2014

(54) HYDRAULICALLY SETTING SEALING COMPOSITION

(75) Inventors: Dimitrios Moussios, Dubai (AE); Jürgen Bezler, Burghausen (DE); Mohammed Sanaobar, Dubai (AE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/141,276

(22) PCT Filed: Dec. 17, 2009

(86) PCT No.: PCT/EP2009/067359
§ 371 (c)(1),
(2), (4) Date: Jun. 21, 2011

(87) PCT Pub. No.: WO2010/072641
PCT Pub. Date: Jul. 1, 2010

(65) Prior Publication Data
US 2011/0257303 A1    Oct. 20, 2011

(30) Foreign Application Priority Data
Dec. 22, 2008    (AE) .................................. 1293/2008

(51) Int. Cl.
*C04B 24/26* (2006.01)
*C09D 131/04* (2006.01)
*C09D 125/10* (2006.01)

(52) U.S. Cl.
USPC ............................................................. 524/5

(58) Field of Classification Search
USPC .............................................................. 524/5
See application file for complete search history.

(56) References Cited

U.S. PATENT DOCUMENTS

| | | | |
|---|---|---|---|
| 4,061,825 A * | 12/1977 | Counsell et al. | ........ 428/355 CP |
| 4,368,077 A | 1/1983 | Ceska | |
| 4,668,541 A | 5/1987 | Fagerlund | |
| 4,670,315 A | 6/1987 | Hillemeier | |
| 4,894,405 A | 1/1990 | Barron | |
| 7,803,853 B2 | 9/2010 | Kothe et al. | |
| 2002/0157576 A1 | 10/2002 | Mills | |
| 2003/0203995 A1* | 10/2003 | Wilson, Sr. | ........................ 524/2 |
| 2007/0037925 A1 | 2/2007 | Weitzel | |
| 2007/0112117 A1* | 5/2007 | Weitzel | .......................... 524/459 |
| 2008/0019773 A1* | 1/2008 | Stadtbaumer et al. | .......... 404/67 |
| 2008/0171812 A1* | 7/2008 | Zhang et al. | ........................ 524/5 |

FOREIGN PATENT DOCUMENTS

| | | | | |
|---|---|---|---|---|
| CN | 1055531 A | 10/1991 | | |
| CN | 1906138 A | 1/2007 | | |
| CN | 1497025 A | 5/2007 | | |
| CN | 100999612 A | 7/2007 | | |
| DE | 3048818 | 9/1981 | | |
| DE | 3445396 | 6/1986 | | |
| GB | 2288393 | 10/1995 | | |
| JP | 551211869 | 9/1980 | | |
| JP | 03039387 | 2/1991 | | |
| JP | 03-290348 | * 12/1991 | ............. C04B 28/08 | |
| JP | 09086993 | 3/1997 | | |
| JP | 09087061 | 3/1997 | | |
| WO | 8604889 | 8/1986 | | |
| WO | 0128955 | 4/2001 | | |
| WO | 2004092094 | 10/2004 | | |
| WO | 2005070849 | 8/2005 | | |

OTHER PUBLICATIONS

Novak, Robert Slagstar A binder of the highest quality without calcining process. Feb. 17, 2004.*
Adedeji, A. A. Estimation of service life of coated brickwork mortar joint. Cement and Concrete Research 32 (2002) 199-203.*
Coppola, L. et al., "Four-Year Behavior of Polymer-Cement Coatings for Concrete Protection," American Concrete Institute, SP (2000), SP 192-73, pp. 1209-1220.
International Search Report for PCT/EP2009/067359 filed Dec. 17, 2009, mailed Jun. 7, 2010.

* cited by examiner

*Primary Examiner* — John Uselding
(74) *Attorney, Agent, or Firm* — RatnerPrestia

(57) ABSTRACT

The invention provides hydraulically setting sealing composition based on a) a hydraulically setting compound out of the group comprising high-alumina cement, ordinary portland cement, blast furnace slag, b) protective-colloide stabilized polymer of one or more ethylenically unsaturated monomers in form of an aqueous polymer dispersion or a water-redispersible polymer powder, and c) one or more fillers.

11 Claims, No Drawings

HYDRAULICALLY SETTING SEALING COMPOSITION

CROSS REFERENCE TO RELATED APPLICATIONS

This application is the national phase filing of international patent application No. PCT/EP2009/067359, filed 17 Dec. 2009, and claims priority of United Arab Emirates patent application number 1293/2008, filed 22 Dec. 2008, the entireties of which applications are incorporated herein by reference.

FIELD OF THE INVENTION

The present invention concerns hydraulically setting sealing compositions for the protection of concrete structures.

BACKGROUND OF THE INVENTION

Accelerated deterioration of reinforced concrete structures is a well reported phenomenon. It occurs particularly in regions with aggressive environment. An example for such regions are the coastal areas of the Arabian Gulf. The environmental conditions of the Arabian Gulf are characterized by high temperature and humidity. Due to the closed nature of the Arabian Gulf, the salinity of the seawater is more than that in other areas of the world. The same is right for the salt concentration in the air, particularly in coastal regions. Such climatic effects reduces significantly the durability of concrete structures as well on shore as offshore.

Coppola L. et al, American Concrete Institute, SP (2000), SP-192-73, p. 1209-1220 describe the use of sealing slurries for the protection of concrete structures. The sealing slurries are composed of an acrylic polymer emulsion, cement and metakaolin. In JP 09-087061 a composition for coating concrete structures is recommended, composed of a vinyl acetate ethylene copolymer emulsion, which is stabilized with non-ionic emulsifier, alumina cement and silica sand. JP 03-039387 refers to a protection material for concrete composed of a polymer latex, alumina cement, transition metal oxide, iron oxide and sand. For the protection of corrosion on a surface contacted with seawater JP 55-121869 recommends a double-layered coating, with a first layer built with a mixture composed of aqueous polymer emulsion, portland cement or blast furnace cement, and a topcoat composed of copper sulphate and an aqueous polymer emulsion.

DE 3048818 A1 describes the improvement of concrete structures with polymer latex compositions containing waxy additives. Concrete modified with these latex compositions shows an improved corrosion resistance in contact with salt water. The coating of concrete structures with a curable polymer resin is the subject of DE 3445396 A1. WO 86/04889 A1 concerns the utilization of compositions based on polymer latex, aluminous cement and gypsum for obtaining crack-free concrete compositions with low water-permeability. U.S. Pat. No. 4,668,541 B describes a method for protecting concrete structures against damages caused by chloride-initiated corrosion. The method is characterized in that a layer of slag-cement concrete is applied to the concrete structure. The U.S. Pat. No. 4,894,405 is related to a coating composition formed by a polyurethane component and an organosiloxane component. The main objective is to stop corrosion generated by chlorine ions.

SUMMARY OF THE INVENTION

It is an object of the invention to protect concrete structures even if exposed in harmful environment, like marine or splash zone environment where the conditions are severely corrosive. The surface of the concrete structures shall be protected against mechanical erosion due to wind (sand storms) or pounding waves, too.

This object has surprisingly been able to be achieved by the inventive combination of hydraulically setting components with a polymer component.

DETAILED DESCRIPTION OF THE INVENTION

The invention provides hydraulically setting sealing composition based on
a) a hydraulically setting compound out of the group comprising high-alumina cement, ordinary portland cement, blast furnace slag,
b) protective-colloid stabilized polymer of one or more ethylenically unsaturated monomers in form of an aqueous polymer dispersion or a water-redispersible polymer powder, and
c) one or more fillers.

In general the composition contains from 5% by weight to 50% by weight of component a), preferably 5% by weight to 25% by weight, in each case based on the total weight of the dry materials a) to c).

Component a) comprises high-alumina cement or ordinary portland cement or blast furnace slag. Preferred high-alumina cement is calcium aluminate cement (CAC) according to DIN EN 14647. Preferred ordinary portland cement is ordinary portland cement (OPC) according to DIN EN 197-1 (CEM I to CEM V). In general blast furnace slag contains 30 to 45% by weight CaO, 30 to 45% by weight $SiO_2$, 5 to 15% by weight $Al_2O_3$, 4 to 17% by weight MgO, 0.5 to 1% by weight S and traces of further elements. Commercially available blast furnace slag is Slagstar® of Baumit or Merit 5000 of SSAB Merox.

In a preferred embodiment the components a) are used alternatively in the composition. Particularly preferred as the only component a) is blast furnace slag. Preferred combinations of components a) are the combination of high-alumina cement with blast furnace slag, or the combination of ordinary portland cement with blast furnace slag. If combinations are used in the composition, the composition contains from 5% by weight to 50% by weight of the combination, preferably 5% by weight to 25% by weight, in each case based on the total weight of the dry materials a) to c).

In general the composition contains from 10% by weight to 50% by weight, preferably from 10% by weight to 30% by weight of the polymer b), in each case based on the total weight of the components a) to c). In the case of polymer dispersions the amount in % by weight refers to the solids content of the polymer dispersions.

Preferably the aqueous polymer dispersion or the water-redispersible polymer powder is based on polymers of one or more monomers from the group consisting of vinyl esters, (meth)acrylates, vinyl aromatics, olefins, 1,3-dienes and vinyl halides and, if required, further monomers copolymerizable therewith.

Examples of suitable homo- and copolymers are vinyl acetate homopolymers, copolymers of vinyl acetate with ethylene, copolymers of vinyl acetate with ethylene and with one or more other vinyl esters, copolymers of vinyl acetate with ethylene and (meth)acrylic ester, copolymers of vinyl acetate with (meth)acrylates and other vinyl esters, copolymers of vinyl acetate with ethylene and vinyl chloride, copolymers of vinyl acetate with acrylates, styrene-acrylic ester copolymers, styrene-1,3-butadiene copolymers, vinyl chloride-ethylene-copolymers.

Preference is given to vinyl acetate homopolymers;

Copolymers of vinyl acetate with from 1 to 40% by weight of ethylene;

Copolymers of vinyl acetate with from 1 to 40% by weight of ethylene and from 1 to 50% by weight of one or more other comonomers from the group of vinyl esters having from 1 to 15 carbon atoms in the carboxylic acid radical, e.g. vinyl propionate, vinyl laurate, vinyl esters of alpha-branched carboxylic acids having from 9 to 13 carbon atoms (versatic acids), such as VeoVa9, VeoVa10, VeoVa11;

Copolymers of vinyl acetate, from 1 to 40% by weight of ethylene, and preferably from 1 to 60% by weight of (meth) acrylic ester of unbranched or branched alcohols having from 1 to 15 carbon atoms, in particular N-butyl acrylate or 2-ethylhexyl acrylate; and Copolymers using from 30 to 75% by weight of vinyl acetate, from 1 to 30% by weight of vinyl laurate or vinyl esters of an alpha-branched carboxylic acid having from 9 to 13 carbon atoms, and also from 1 to 30% by weight of (meth) acrylic esters of unbranched or branched alcohols having from 1 to 15 carbon atoms, in particular n-butyl acrylate or 2-ethyl hexyl acrylate, where these also contain from 1 to 40% by weight of ethylene;

Copolymers using vinyl acetate, from 1 to 40% by weight of ethylene, and from 1 to 60% by weight of vinyl chloride; where the % by weight data in each case give a total of 100% by weight.

Preference is also given to (meth)acrylate copolymers, for example copolymers of n-butyl acrylate or 2-ethylhexyl acrylate, or copolymers of methyl methacrylate with n-butyl acrylate and/or 2-ethylhexyl acrylate;

Styrene-acrylic ester copolymers using one or more monomers from the group of methyl acrylate, ethyl acrylate, propyl acrylate, n-butyl acrylate, 2-ethylhexyl acrylate;

Vinyl acetate-acrylic ester copolymers using one or more monomers from the group of methyl acrylate, ethyl acrylate, propyl acrylate, n-butyl acrylate, 2-ethylhexyl acrylate, and, where appropriate, ethylene;

Styrene-1,3-butadiene copolymers; Vinyl chloride-ethylene copolymers;

where the % by weight data in each case give a total of 100% by weight.

Aqueous polymer dispersions and the water-redispersible powders of the abovementioned polymers that are obtainable from them by drying are known and are available commercially. The polymers are prepared in a conventional manner, preferably by the emulsion polymerization process. Processes for the preparation of aqueous polymer dispersions and redispersible polymer powders are described in WO 2004/092094, which is incorporated here by reference.

The dispersions are stabilized with a protective colloid. Suitable protective colloids are partially hydrolyzed or fully hydrolyzed polyvinyl alcohols; polyvinylpyrrolidones; polyvinylacetals; polysaccharides in water-soluble form such as starches (amylose and amylopectin), celluloses and their carboxymethyl, methyl, hydroxyethyl, and hydroxypropyl derivatives; proteins such as casein or caseinate, soya protein, and gelatin; lignin sulfonates; synthetic polymers such as poly(meth)acrylic acid, copolymers of (meth)acrylates with carboxy-functional comonomer units, poly(meth)acrylamide, polyvinylsulfonic acids, and the water-soluble copolymers thereof; melamine-formaldehyde sulfonates, naphthalene-formaldehyde sulfonates, and styrene-maleic acid and vinyl ether-maleic acid copolymers. Partially hydrolyzed or fully hydrolyzed polyvinyl alcohols are preferred. Particular preference is given to partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015). Most preferred are polymer compositions without emulsifier.

Suitable fillers c) are quartz sand, quartz flour, calcium carbonate, dolomite, aluminum silicates, fumed silica, talc or mica, fibers, or lightweight fillers such as pumice, foamed glass, aerated concrete, perlites or vermiculites. Mixtures of said fillers may also be used. The filler fraction is preferably from 10 to 90% by weight, with particular preference from 75 to 90% by weight, in each case based on the total weight of the components a) to c).

The sealing compositions may contain further common ingredients out of the group of pozzolanic compounds, thickener, retardants.

Most preferred further ingredients are additives having pozzolanic properties (pozzolanas). Pozzolanas are silica-containing or silica- and alumina-containing natural or synthetic materials which are not themselves able to act as binders but together with water and lime form water-insoluble compounds having cement-like properties. A distinction is made between natural and synthetic pozzolanas. Natural pozzolanas include glass-rich ashes and rocks of volcanic origin, for example pumice, trass (finely milled tuff), Santorin earth, kieselguhr, hornstones (silica rocks), chert and moler earth. Synthetic pozzolanas include fired, ground clay (ground brick), fly ashes such as ash from a coal-fired power station, silica dust, oil shale ash (oil shale=bituminous, lime-containing shale) and calcined kaolin (metakaolin).

The synthetic pozzolanas are preferably selected from the group consisting of ground brick, fly ash, silica dust, oil shale ash and metakaolin. The greatest preference is given to fly ash or silica dust. The amount used is from 0 to 20% by weight, preferably from 0.5 to 10% by weight, in each case based on the total weight of the dry materials a) to c).

Examples of thickeners are polysaccharides such as cellulose ethers and modified cellulose ethers, starch ethers, guar gum or xanthan gum, phyllosilicates, polycarboxylic acids such as polyacrylic acid and the partial esters thereof, polyvinyl alcohols, which optionally have been acetalized and/or hydrophobically modified, casein, and associative thickeners. It is also possible to use mixtures of these or other thickeners. Preference is given to the cellulose ethers, modified cellulose ethers, optionally acetalized and/or hydrophobically modified, polyvinyl alcohols, and mixtures thereof. It is preferred to use from 0.05 to 2.5% by weight, with particular preference from 0.05 to 0.5% by weight, of thickeners, in each case based on the total weight of the dry materials a) to c).

Frequently used retardants have been selected from hydroxycarboxylic acids or dicarboxylic acids or salts thereof, as well as saccharides. Examples include oxalic acid, succinic acid, tartaric acid, gluconic acid, citric acid, sucrose, glucose, fructose, sorbitol and pentaerythritol. Further examples of retarders are polyphosphates, metaphosphoric acid, and borax.

If the polymer component b) is used in form of a redispersible polymer powder, the cementitious sealing compositions is generally prepared by mixing components a) to c), and optionally one or more of the above mentioned further ingredients, to a dry mortar in conventional powder mixers and homogenizing the mixture. The amount of water needed for processing is added immediately prior to processing. Another possible procedure is to add individual components only subsequently to the mixture prepared by stirring with water.

If the polymer component b) is used in form of an aqueous polymer dispersion, the components a) to c), and optionally further ingredients, and if necessary an additional amount of water are mixed for obtaining a pasty mortar.

The water ratio to be added to the dry mix depends on the type of application. Usually water is added in an amount of 25% by weight to 50% by weight, based on the dry weight of the cementitious sealing composition.

The cementitious sealing composition is used as a coating for the protection of concrete materials, particularly as a salt resistant coating for concrete structures which are exposed to seawater, especially at waterline (splash zone area).

EXAMPLES

For testing the cementitious sealing compositions the following polymer components have been used:
Polymer 1:
Redispersible polymer powder on the basis of a vinyl acetate-ethylene-copolymer with a glass transition temperature Tg of −7° C.
Polymer 2:
Redispersible polymer powder on the basis of a vinyl acetate-ethylene-versatic acid ester-copolymer with a glass transition temperature Tg of −14° C.

The sealing slurry compositions of table 1 have been prepared with the following method:

The constituents of the formulation were mixed dry for 3 minutes in a mortar mixer. The water was then added, and mixing was continued for a further 2 minutes. After a maturing time of 10 minutes, the mortar was mixed for 30 seconds and then spread by means of a trowel in a Teflon template to give a 2 mm thick sealing coat, after drying it was removed from the template and then stored at the following conditions:
28 days standard conditions (SC)
14 days SC+14 days water immersion (WI)
14 days SC+7 days WI+7 days SC
7 days SC+21 days sea salt water (30° C.) (SSW)
7 days SC+21 days SSW+2 days SC After storage, tensile bars were stamped from the sealing coats and the tensile strength (N/mm$^2$) and elongation at break (%) of these were determined in a tensile test in accordance with DIN 53504 on an Instron tensile tester at an extension rate of 10 mm/min. Crack bridging (mm) was determined according EN 14891.

The mean values of the individual series of measurements are given in Table 1.

TABLE 1

| Formulation | Slurry 1 (p.b.w.) | Slurry 2 (p.b.w) | Slurry 3 (p.b.w.) |
|---|---|---|---|
| Ca aluminate cement (Fondu, Bomix) | 70.0 | | |
| Portland Cement OPC | | 200 | |
| Blast Furnace Slag (Slagstar$^R$) | 130.0 | | 200 |
| Polymer 1 | | | |
| Polymer 2 | 300.0 | 300 | 300 |
| Silica sand (0-212μ) | 300.0 | 400 | 400 |
| CaCO$_3$ (25μ) | 134.0 | | |
| Microsphere filler (Fillite) | 50.0 | | |
| Polyacrylonitrile fiber (3 mm) | 5.0 | 5.0 | 5.0 |
| Fumed silica (HDK H 15) | 5.0 | | |
| Tartaric acid | 1.0 | | |
| Thickener (Viscalex HV 100) | 5.0 | | |
| Total parts by weight | 1000.0 | 905.0 | 905.0 |
| Water demand | 320.0 | 310.0 | 310.0 |
| Test Result | | | |
| Hydrostatic Pressure (1.5 bars) | Pass | Pass | Pass |
| Tensile strength (N/mm$^2$) | | | |
| 28 days SC | 2.30 | 2.50 | 2.00 |
| 14 days SC + 14 days WI | 0.76 | 0.84 | 1.05 |

TABLE 1-continued

| Formulation | Slurry 1 (p.b.w.) | Slurry 2 (p.b.w) | Slurry 3 (p.b.w.) |
|---|---|---|---|
| 14 days SC + 7 days WI + 7 days SC | 1.07 | 1.38 | 1.45 |
| 7 days SC + 21 days SSW | 1.01 | 1.45 | 1.24 |
| Elongation at break (%) | | | |
| 28 days SC | 7.79 | 25.74 | 19.89 |
| 14 days SC + 14 days WI | 5.34 | 7.88 | 11.03 |
| 14 days SC + 7 days WI + 7 days SC | 3.31 | 8.78 | 15.04 |
| 7 days SC + 21 days SSW | 8.47 | 17.17 | 10.66 |
| Crack bridging (mm) | | | |
| 28 days SC | 0.99 | 1.09 | 0.85 |
| 7 days SC + 21 days SSW | 0.84 | 0.99 | 0.75 |
| 7 days SC + 21 days SSW + 2 days SC | 0.76 | 1.14 | 0.61 |

The invention claimed is:

1. A coating on an external surface of a concrete structure, wherein the coating is formed by hydraulically setting on said surface a sealing composition comprising
    a) a hydraulically setting compound consisting of blast furnace slag,
    b) a protective-colloid stabilized polymer of one or more ethylenically unsaturated monomers in the form of an aqueous polymer dispersion or a water-redispersible polymer powder, and
    c) one or more fillers;
    wherein the sealing composition does not contain high alumina cement, wherein the blast furnace slag is the only hydraulically setting compound in the sealing composition, and wherein all of the surfaces of the concrete structure that are exposed to seawater are coated with the composition.

2. The coating as claimed in claim 1, wherein polymers b) used are vinyl acetate homopolymers, copolymers of vinyl acetate with ethylene, copolymers of vinyl acetate with ethylene and with one or more other vinyl esters, copolymers of vinyl acetate with ethylene and (meth)acrylic ester, copolymers of vinyl acetate with (meth)acrylates and other vinyl esters, or copolymers of vinyl acetate with ethylene and vinyl chloride.

3. The coating as claimed in claim 1, wherein the coating is a salt resistant coating for concrete structures which are exposed to seawater.

4. The coating as claimed in claim 2, wherein the coating is a salt resistant coating for concrete structures which are exposed to seawater.

5. The coating as claimed in claim 1, wherein polymers b) used are copolymers of vinyl acetate with acrylates, styrene-acrylic ester copolymers, styrene-1,3-butadiene copolymers, or vinyl chloride-ethylene copolymers.

6. The coating as claimed in claim 5, wherein the coating is a salt resistant coating for concrete structures which are exposed to seawater.

7. The coating as claimed in claim 1, wherein polymers b) used are copolymers of vinyl acetate with from 1 to 40% by weight of ethylene, or copolymers of vinyl acetate with from 1 to 40% by weight of ethylene and from 1 to 50% by weight of one or more other comonomers selected from the group consisting of vinyl esters having from 1 to 15 carbon atoms in the carboxylic acid radical.

8. The coating as claimed in claim 1, wherein the polymers b) are stabilized with partially hydrolyzed polyvinyl alcohols having a degree of hydrolysis of from 80 to 95 mol % and a Höppler viscosity in 4% strength aqueous solution of from 1 to 30 mPas (Höppler method at 20° C., DIN 53015).

9. The coating as claimed in claim 1, wherein the fillers c) are quartz sand, quartz flour, calcium carbonate, dolomite, aluminum silicates, fumed silica, talc or mica, fibers, or lightweight fillers.

10. The coating as claimed in claim 1, wherein fumed silica is used as filler c).

11. The coating as claimed in claim 1, wherein additives having pozzolanic properties are used as further ingredients.

* * * * *

UNITED STATES PATENT AND TRADEMARK OFFICE
CERTIFICATE OF CORRECTION

PATENT NO. : 8,722,772 B2  Page 1 of 1
APPLICATION NO. : 13/141276
DATED : May 13, 2014
INVENTOR(S) : Dimitrios Moussios et al.

It is certified that error appears in the above-identified patent and that said Letters Patent is hereby corrected as shown below:

On the Title page, Item (56), FOREIGN PATENT DOCUMENTS, "JP 551211869"
should read -- JP55121869 --

Signed and Sealed this
Fifth Day of August, 2014

Michelle K. Lee
*Deputy Director of the United States Patent and Trademark Office*